United States Patent
Voros (10) Patent No.: US 8,976,043 B2
(45) Date of Patent: Mar. 10, 2015

(54) ILLUMINATED SIDESTICK CONTROLLER, SUCH AS AN ILLUMINATED SIDESTICK CONTROLLER FOR USE IN AIRCRAFT

(75) Inventor: Robert Edward Voros, Andover, KS (US)

(73) Assignee: Textron Innovations, Inc., Providence, RI (US)

( * ) Notice: Subject to any disclaimer, the term of this patent is extended or adjusted under 35 U.S.C. 154(b) by 239 days.

(21) Appl. No.: 13/589,663

(22) Filed: Aug. 20, 2012

(65) Prior Publication Data
US 2014/0049407 A1    Feb. 20, 2014

(51) Int. Cl.
| G08B 23/00 | (2006.01) |
| G01C 23/00 | (2006.01) |
| B64C 13/04 | (2006.01) |
| G01D 11/28 | (2006.01) |
| G01C 25/00 | (2006.01) |
| B60W 10/04 | (2006.01) |
| B64C 13/10 | (2006.01) |

(52) U.S. Cl.
CPC ..................... B64C 13/10 (2013.01)
USPC ........ 340/963; 340/967; 340/975; 340/426.3; 340/3.71; 340/4.11; 244/220; 244/224; 244/234; 244/237; 244/229; 362/23.01; 362/23.07; 73/1.08; 73/862.53

(58) Field of Classification Search
USPC ............ 340/963, 967, 975, 426.3, 3.71, 4.11; 440/87, 6, 84; 224/220, 224, 234, 237, 224/223, 229
See application file for complete search history.

(56) References Cited

U.S. PATENT DOCUMENTS

| 4,150,803 | A | 4/1979 | Fernandez |
| 4,779,169 | A | 10/1988 | Cruze |
| 5,002,241 | A * | 3/1991 | Tizac ............................. 244/237 |
| 5,264,768 | A | 11/1993 | Gregory et al. |
| 5,291,113 | A | 3/1994 | Hegg et al. |
| 5,404,305 | A | 4/1995 | Stiles, Jr. |
| 5,694,014 | A | 12/1997 | Hegg et al. |
| 5,868,359 | A * | 2/1999 | Cartmell et al. .............. 244/223 |
| 5,900,710 | A | 5/1999 | Gautier et al. |
| 6,662,742 | B2 * | 12/2003 | Shelton et al. ................ 114/312 |
| 7,055,997 | B2 | 6/2006 | Baek |
| 7,575,491 | B1 * | 8/2009 | Martin ............................. 440/87 |
| 8,297,550 | B2 * | 10/2012 | Balaskovic ..................... 244/96 |
| 2006/0245620 | A1 * | 11/2006 | Roques et al. ................. 382/115 |
| 2007/0085761 | A1 * | 4/2007 | Schoen et al. .................. 345/31 |
| 2009/0021490 | A1 * | 1/2009 | Stickels ........................ 345/173 |
| 2011/0051442 | A1 | 3/2011 | Chang |
| 2011/0066305 | A1 * | 3/2011 | Lin et al. ........................... 701/3 |
| 2011/0270474 | A1 * | 11/2011 | Builta et al. ...................... 701/7 |

* cited by examiner

*Primary Examiner* — Fekadeselassie Girma
(74) *Attorney, Agent, or Firm* — Lathrop & Gage LLP (57) ABSTRACT

A system and method for illuminating one or more sidestick controllers within a cockpit of an aircraft is described. In some embodiments, the system includes a sidestick controller having lighting components that display lighting behaviors representing the movement and/or control of an aircraft. In some embodiments, the system illuminates various different lighting components on a sidestick controller based on information received from aircraft control systems, cockpit lighting systems, and other systems associated with an aircraft.

22 Claims, 9 Drawing Sheets

ILLUMINATED SIDESTICK CONTROLLER, SUCH AS AN ILLUMINATED SIDESTICK CONTROLLER FOR USE IN AIRCRAFT

BACKGROUND

In aircraft with mechanically operated flight control systems, pilot controls are physically interconnected between the pilot station, the co-pilot station, and the auto-flight system. This physical interconnection facilitates flight crew awareness regarding changes and/or manipulations to the flight control system, such as those performed by a pilot or the auto-flight system. This awareness is quite important, because it allows a member of the flight crew when not in command to monitor the behaviors of the system and respond to them when they are not appropriate, in order to avoid and/or prevent system behaviors that might place the crew or the aircraft in danger.

A majority of fly-by-wire flight control systems do not have these physical interconnections and provide this system behavioral awareness solely through the flight crew displays and aircraft response. These fly-by-wire systems use passive pilot flight controls, which incorporate a set stiffness and damping which will not vary based on flight control system manipulation. While some fly-by-wire flight control systems do provide system awareness by varying force and damping in the pilot and co-pilot controls in response to inputs from the flight crew or auto-flight system, such feedback mechanisms may not be sufficient in certain flying conditions and/or environments, such as in cockpits having dim or variable lighting, conditions where the motion of a sidestick controller may not be readily observed, and so on.

Therefore, the need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

A system and method for illuminating one or more sidestick controllers within a cockpit of an aircraft is described. In some embodiments, the system includes a sidestick controller having lighting components that provide information about the movement and/or control of an aircraft, such as information associated with activity of an auto-flight control system, activity of an opposing sidestick controller, and so on. In some embodiments, the system illuminates various different lighting components on a sidestick controller based on information received from aircraft control systems, cockpit lighting systems, and other systems associated with an aircraft.

In some embodiments, the system includes an illuminated sidestick controller, such as a sidestick controller having an illuminated grip, illuminated base, or other illuminating indicator proximate to, or otherwise associated with the controller. The illuminated sidestick controller may include one or more LEDs, displays, or other lighting components, within or partially within the sidestick controller. The illuminated sidestick controller may provide and/or display various lighting patterns and/or behaviors in response to the activities of flight control systems and devices, such as activities of auto-flight systems, activities of other sidestick controllers, and so on. The various lighting patterns and/or behaviors may include displaying multiple lights in a certain pattern, displaying differently colored lights, displaying different intensities of the lights, presenting various icons via a display, and so on.

In some embodiments, the system includes various components configured to illuminate lighting components of a sidestick controller. For example, the system may include components configured to receive, monitor, identify, and/or determine information associated with various flight control activities, and/or components configured to identify and/or determine appropriate lighting actions to perform in response to received control activity information, and so on.

Therefore, a system and method that illuminates a sidestick controller, such as various sections of a grip of a sidestick controller, in various patterns and/or behaviors indicative of aircraft control system activity may provide improved pilot or co-pilot awareness of such control system activity, among other benefits.

The system will now be described with respect to various embodiments and examples. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

As described herein, in some embodiments, the system includes one or more illuminated sidestick controllers that display certain lights and/or patterns of lights within a cockpit of an aircraft in order to indicate to the crew members of the aircraft various control activities and operations being performed by the aircraft and the flight control systems of the aircraft, among other things.

Figure 1:
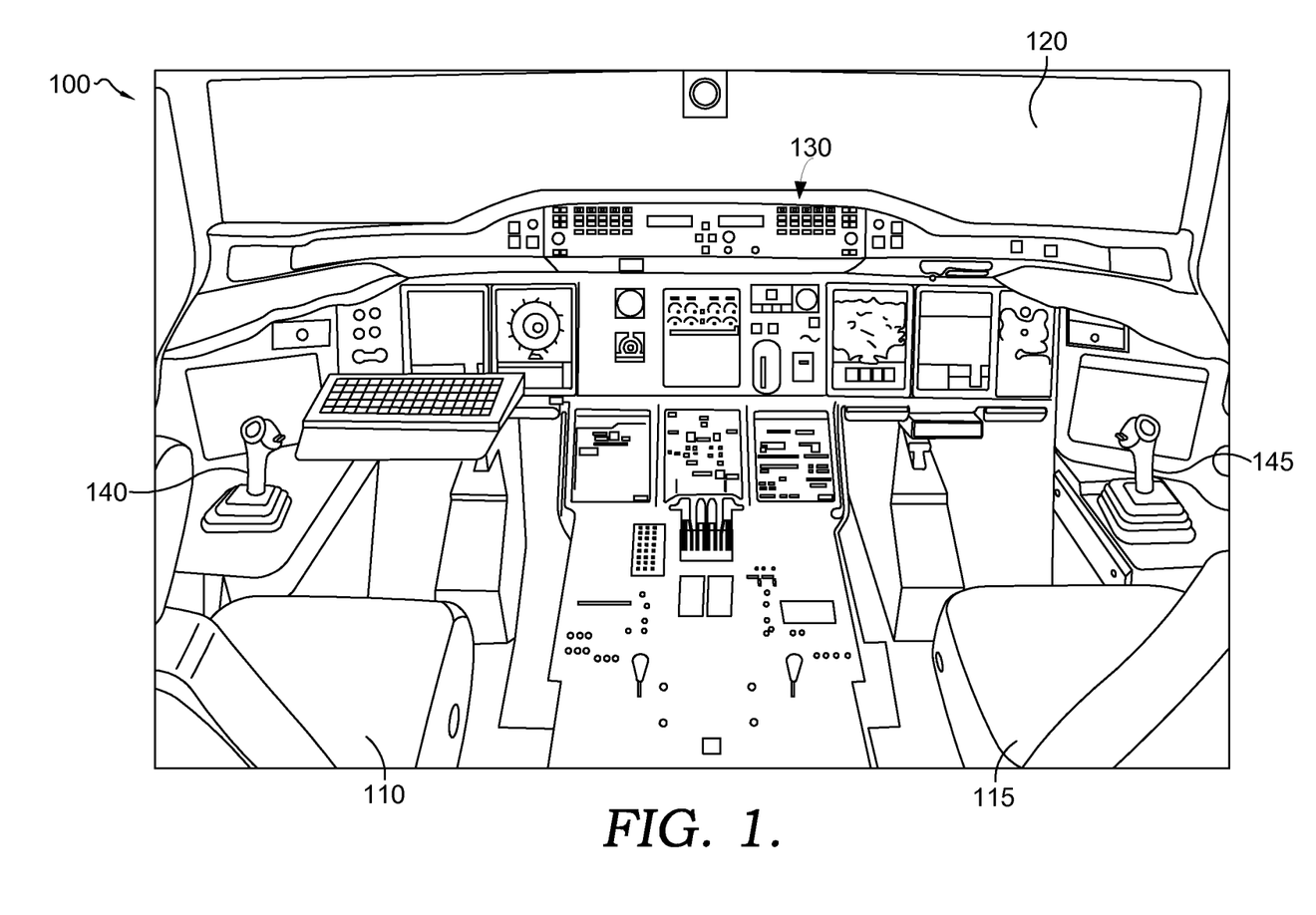
FIG. 1 is a schematic diagram illustrating a suitable aircraft environment for an illuminated sidestick controller.

FIG. 1 illustrates a suitable aircraft environment 100 in which an illuminated sidestick controller may provide awareness and other information indicative of flight control activities. The aircraft environment 100, such as a cockpit or flight deck, may include a pilot station 110, a co-pilot station 115, a front windshield 120, various instrument panels 130, a pilot sidestick controller 140, and a co-pilot sidestick controller 145, among other devices and/or components not shown in FIG. 1.

The instrument panels 130 may provide and/or display information associated with most aircraft control systems, receive input from a pilot or co-pilot during operation of the aircraft, facilitate communication of data and voice calls between the flight crew and outside flight professionals, and so on. For example, the panels 130 may display information from and/or receive input for a fly-by-wire system used to operate the aircraft.

For a fly-by-wire system with active sidestick controllers, the system may act as a feedback loop. For example, in response to movement of a pilot sidestick controller 140, the system may send a signal to the fly-by-wire control system, often using multiplexing techniques to ensure the signal reaches the control system. The control system may receive the signal, condition the signal, and transfer the signal to an actuator associated with the co-pilot sidestick controller 145, causing the co-pilot sidestick controller 145 to move in tandem with the pilot sidestick controller 140. That is, a fly-by-wire system may facilitate the coordinated movement between the two sidestick controllers 140, 145 within the cockpit 100, among other things.

Illuminated Sidestick Controllers

Each of the stations 110, 115 may include or be associated with an illuminated sidestick controller 140, 145. In some embodiments, the sidestick controllers 140, 145 may include a control module, such as a module or components configured to control operation of the aircraft, and an illumination module, such as a module or components configured to display one or more lighted signals associated with operation of the aircraft.

Figure 2A:
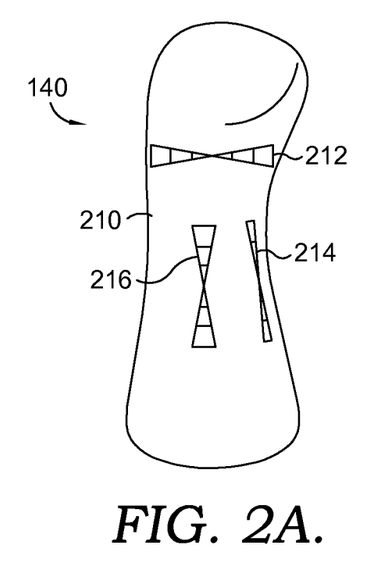
FIG. 2A is a schematic diagram illustrating a pilot-side illuminated sidestick controller.

FIG. 2A illustrates the pilot-side illuminated sidestick controller 140. The pilot-side illuminated sidestick controller 140 may include a grip 210 or housing, which may contain (or contain a part of and/or house) multiple lighting components, such as a top lighting component 212, a side lighting component 214, a middle lighting component 216, and so on.

Figure 2B:
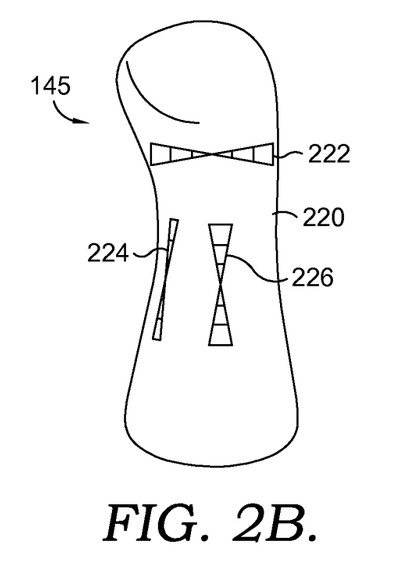
FIG. 2B is a schematic diagram illustrating a co-pilot-side illuminated sidestick controller.

FIG. 2B illustrates the co-pilot side illuminated sidestick controller 145. Similar to the pilot illuminated sidestick controller 140, the co-pilot illuminated sidestick controller may include a grip 220 or housing, which may contain (or contain a part of and/or house) multiple lighting components, such as a top lighting component 222, a side lighting component 224, a middle lighting component 226, and so on.

For example, while the pilot sidestick controller 140 is being used to perform a "roll activity" of the aircraft towards the right, the co-pilot sidestick controller 145 may display a lighting pattern that includes lights progressing from left to right via the top lighting component 222 along with lights progressing from bottom to top via the middle lighting component 226, with both lighting components in tandem displaying a pattern of lights that indicates a roll of the aircraft to the right.

As described herein, the lighting components of the illuminated sidestick controllers 140, 145 may display various patterns and/or behaviors of lights, such as patterns or behaviors indicative of the control activities of an aircraft. Various types of lighting components may be used, such as light emitting diodes (LEDs), displays, and so on.

Figure 2C:
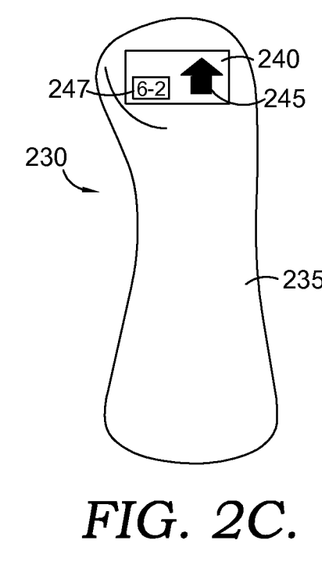
FIG. 2C is a schematic diagram illustrating an illuminated sidestick controller having an illuminated display.

For example, FIG. 2C illustrates an illuminated sidestick controller 230 having an illuminated display 240. The display 240, which may be partially contained within a grip 235 of the sidestick controller 230, may display various icons 245 and/or other graphical elements indicative of control activities of an aircraft, as well as, in some cases, more specific information 247 that provides additional information about a certain activity. For example, the display 240 of the sidestick controller 230 may display an up arrow 245, indicating the aircraft is undergoing a "pitch up" activity, along with the number "6.2" indicating the duration of the "pitch up" activity in seconds. Of course, one of ordinary skill in the art will realize that other icons and/or information may be presented by the system via display 240.

System for Illuminating a Sidestick Controller

Figure 3A:
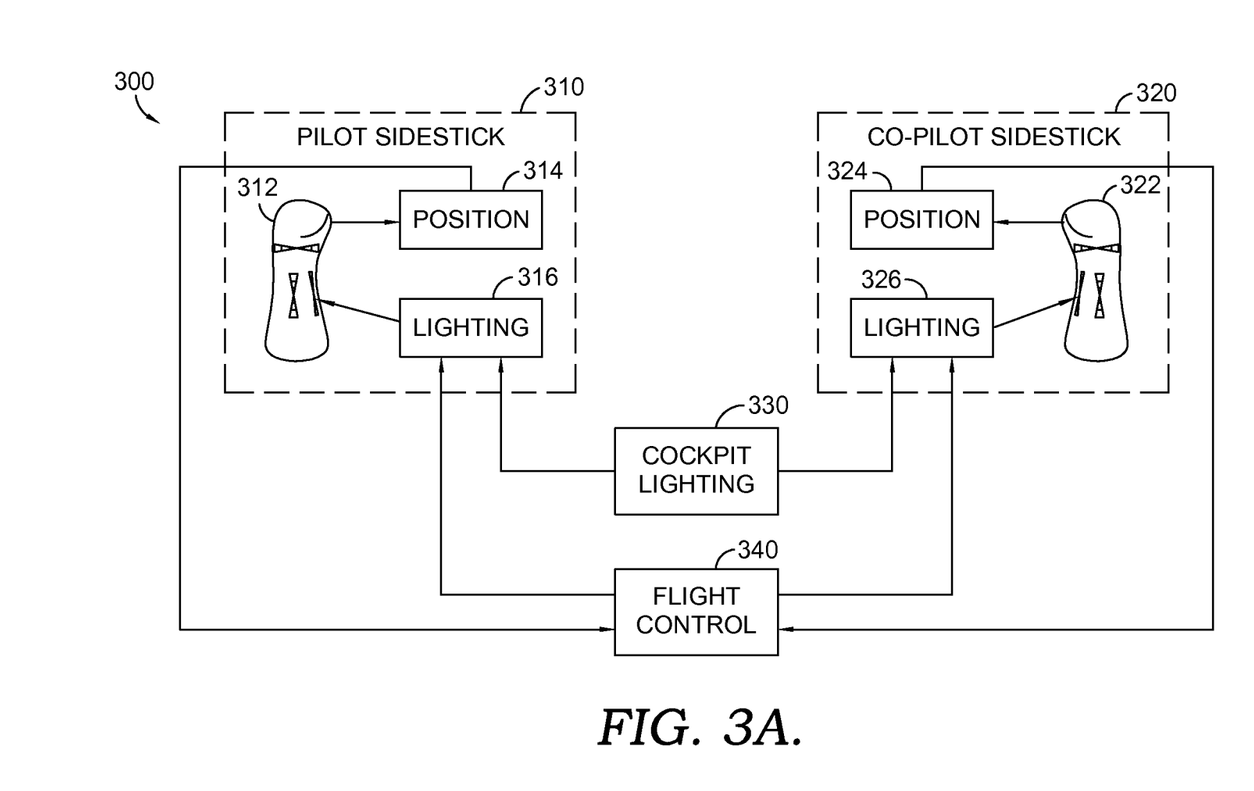
FIG. 3A is a block diagram illustrating an illuminated sidestick controller system.

As described herein, in some embodiments, the system may illuminate various lighting components or elements located on sidestick controllers in order to indicate the control activities of or associated with an aircraft. FIG. 3A is a block diagram illustrating an illuminated sidestick controller system 300.

Figure 3B:
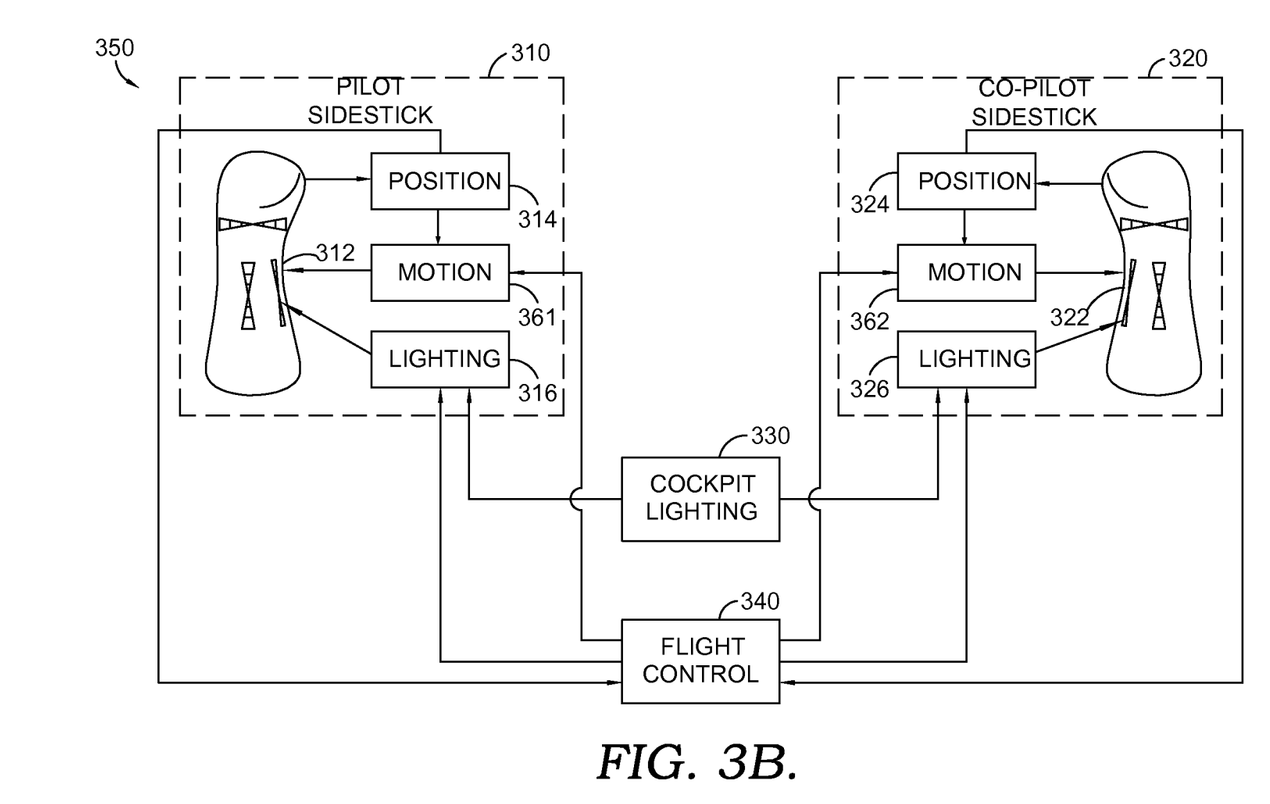
FIG. 3B is a block diagram illustrating an illuminated active sidestick controller system.

FIGS. 3A, 3B, and the discussion herein provide a brief, general description of a suitable computing environment in which the sidestick controller illumination system can be implemented. Although not required, aspects of the system are described in the general context of computer-executable instructions, such as routines executed by airborne electronic hardware, e.g., a flight control computer, a printed circuit board, or other control module. Those skilled in the relevant art will appreciate that the system can be practiced with other communications, data processing, or computer system configurations, including: multi-processor systems, microprocessor-based or programmable electronics, electronic control units, remote electronic units, mainframe computers, control systems, and the like. Indeed, the terms "computer," "host," and "host computer," are generally used interchangeably herein, and refer to any of the above devices and systems, as well as any data processor.

Aspects of the system may be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network and/or databusses, such as ARINC busses, CAN busses, optical busses, or other communications networks. In a distributed computing environment, program modules may be located in both local and remote memory storage devices.

Aspects of the system may be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over databusses or networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system may reside on a server computer, while corresponding portions may reside on a client computer or other control system device, and thus, while certain hardware platforms are described herein, aspects of the system are equally applicable to nodes on a network.

The system 300 for illuminating a sidestick controller may include a pilot sidestick module 310, which may include a pilot sidestick controller 312, a pilot sidestick position component 314, and a pilot sidestick lighting component 316, and a co-pilot sidestick module 320, which may include a co-pilot sidestick controller 322, a co-pilot sidestick position component 324, and a co-pilot sidestick lighting component 326.

The pilot sidestick module 310 and/or the co-pilot sidestick module 320 may receive information from and/or transmit information to various systems within an aircraft, such as a cockpit lighting system 330, a flight control system 340 (which may include an auto-flight system, for example) and/or other systems capable of providing information regarding the state, control, and/or operation of the aircraft.

For example, the system 300 may transfer information associated with movement or displacement of one sidestick controller (e.g., the pilot sidestick controller 312) to the position component 314, which may be a transducer configured to convert the displacement information to various representative signals. The system 300 may transfer the converted signals to the control system 340, which may process and/or transfer the information to the lighting component 326 associated with the co-pilot sidestick controller 322. The co-pilot lighting component 326, upon receipt of the information associated with displacement of the pilot sidestick controller 312, may illuminate various lighting elements of the co-pilot sidestick controller 322 in order to represent the movement or displacement of the pilot sidestick controller 312.

Similarly, and as another example, the system 300 may transfer information associated with movement or displacement of the co-pilot sidestick controller 322 to the co-pilot position component 324, which may be a transducer configured to convert the displacement information to various representative signals. The system 300 may transfer the converted signals to the control system 340, which may process and/or transfer the information to the pilot lighting component 316 associated with the pilot sidestick controller 312. The pilot lighting component 316, upon receipt of the information associated with displacement of the co-pilot sidestick controller 322, may illuminate various lighting elements of the pilot sidestick controller 312 in order to represent the movement or displacement of the co-pilot sidestick controller 322.

In some embodiments, the system 300 may utilize other information from the control system 340 when determining and/or instructing the lighting components 316, 326 to illuminate the sidestick controllers 312, 322 with certain lighting patterns and/or behaviors. For example, the system 300 may illuminate the sidestick controllers with certain lighting patterns and/or behaviors based on warning information associated with flight control system status, flight control conditions, and so on, received from the control system 340. In some cases, this information may be represented by illumination behaviors along with general control information received from a sidestick module and/or an auto-flight system that is already represented by active illumination behaviors. In some cases, the system 300 may represent this information in lieu of active illumination behaviors associated with current control operations.

In some embodiments, the system 300 may adjust, modify, and/or initiate certain illumination behaviors based on information received from the cockpit lighting system 330. For example, the cockpit lighting system 330 may provide information identifying current lighting conditions, e.g., a measure of the lighting levels within the cockpit, to the lighting components 316, 326. The system 300 may utilize such information when determining the brightness with which to illuminate lighting elements 316, 326 on the sidestick controllers 312, 322. That is, the system 300, upon determining the level of lighting is low within a cockpit, may cause the sidestick controllers 312, 322 to provide a brighter than normal illumination pattern (or, for example, an illumination pattern that is dimmer than normal) when presenting control information via illumination behaviors, among other things.

In addition to passive systems, such as the system 300 shown in FIG. 3A, the technology described herein may be utilized by active sidestick controller systems. FIG. 3B is a block diagram illustrating an illuminated active sidestick controller system 350. The active sidestick controller 350 may include, in addition to the components described with respect to FIG. 3A, active sidestick control systems (labeled as "Motion" components in the diagram) 361 & 362, which act to actively move or apply a force to a sidestick controller (e.g., the pilot sidestick controller 312) in response to use and/or operation of the other sidestick controller (e.g. the co-pilot sidestick controller 322). The system 350, therefore, may cause the sidestick controllers to present illumination patterns and/or behaviors in response to such movements along with the active forces applied to the representative controllers.

For example, upon detecting movement of a co-pilot sidestick controller 322, the system 350, via the active sidestick control system 361, may cause the pilot sidestick controller 312 to move in a fashion representative of the detected movement, and also, via the pilot lighting component 316, may cause the pilot sidestick controller 312 to present an illumination pattern representative of the detected movement. Therefore, the system 350 may provide control and/or operation indicators that alleviate the need for active controllers, among other benefits.

Figure 4:
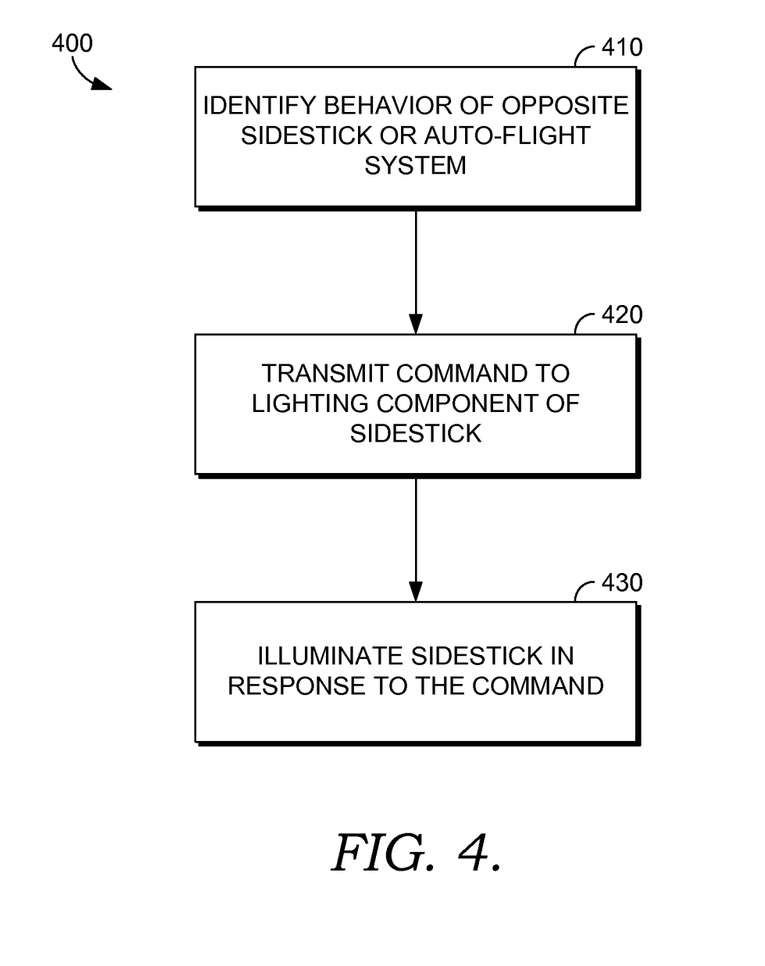
FIG. 4 is a flow diagram illustrating a method for illuminating a sidestick controller.

As described herein, the system 350 may utilize information associated with the control, operation, and/or state of an aircraft and its components in order to perform various routines to determine and/or present representative lighting behaviors via sidestick controllers of the aircraft. FIG. 4 shows a flow diagram 400 illustrating a method for illuminating a sidestick controller.

In step 410, the system 350 identifies a behavior of an opposite sidestick controller or auto-flight system. That is, the system 350, via information received from a position component 314, 324 or an auto-flight system, identifies the current operation of the aircraft.

In step 420, the system 350 generates, transmits and/or transfers a command to a lighting component associated with a sidestick controller. That is, the system 350 transmits a command to the lighting component 316, 326 to illuminate an associated sidestick controller with a pattern and/or behavior that represents the identified current operation of the aircraft.

The system 350 may refer to a data structure, such as a table, list, or other database of information, when generating a command to illuminate a sidestick controller with a certain pattern and/or behavior. The data structure may include various entries that provide pre-determined illumination instructions associated with certain control operations. For example, Table 1 provides (with reference to FIGS. 2A and 2B) an exemplary data structure used by the system 350 when determining what lighting pattern to display:

TABLE 1

| Control Operation | Illumination Pattern |
| --- | --- |
| Roll right | Top element (212 and/or 222)- L to R; Side element (214 and/or 224) - UP |
| Roll left | Top element (212 and/or 222) - R to L; Side element (214 and/or 224) - DOWN |
| Pitch Up | Middle element (216 and/or 226) - UP; |
| Pitch Down | Middle element (216 and/or 226) - DOWN |
| Partial Pitch Up | Middle element (216 and/or 226) - HALF UP |
| Partial Pitch Down | Middle element (216 and/or 226)- HALF DOWN |
| Warning | Side element (214 and/or 224) - BLINKING |

That is, the system 350, via one or more components, may utilize a data structure shown in Table 1 to determine the illumination pattern to display based on the current control operation of an aircraft. Of course, one of ordinary skill in the art will realize that other data structures having more and/or different information may also be utilized by the system.

Referring back to FIG. 4, the system 350, in step 430, illuminates the sidestick controller in response to the received command. That is, the system 350, via the lighting component 316, 326, causes the lighting elements of the sidestick controller 312, 322 to display and/or present the illumination behavior determined to represent the identified behavior of the opposite sidestick controller or the auto-flight system.

Figure 5:
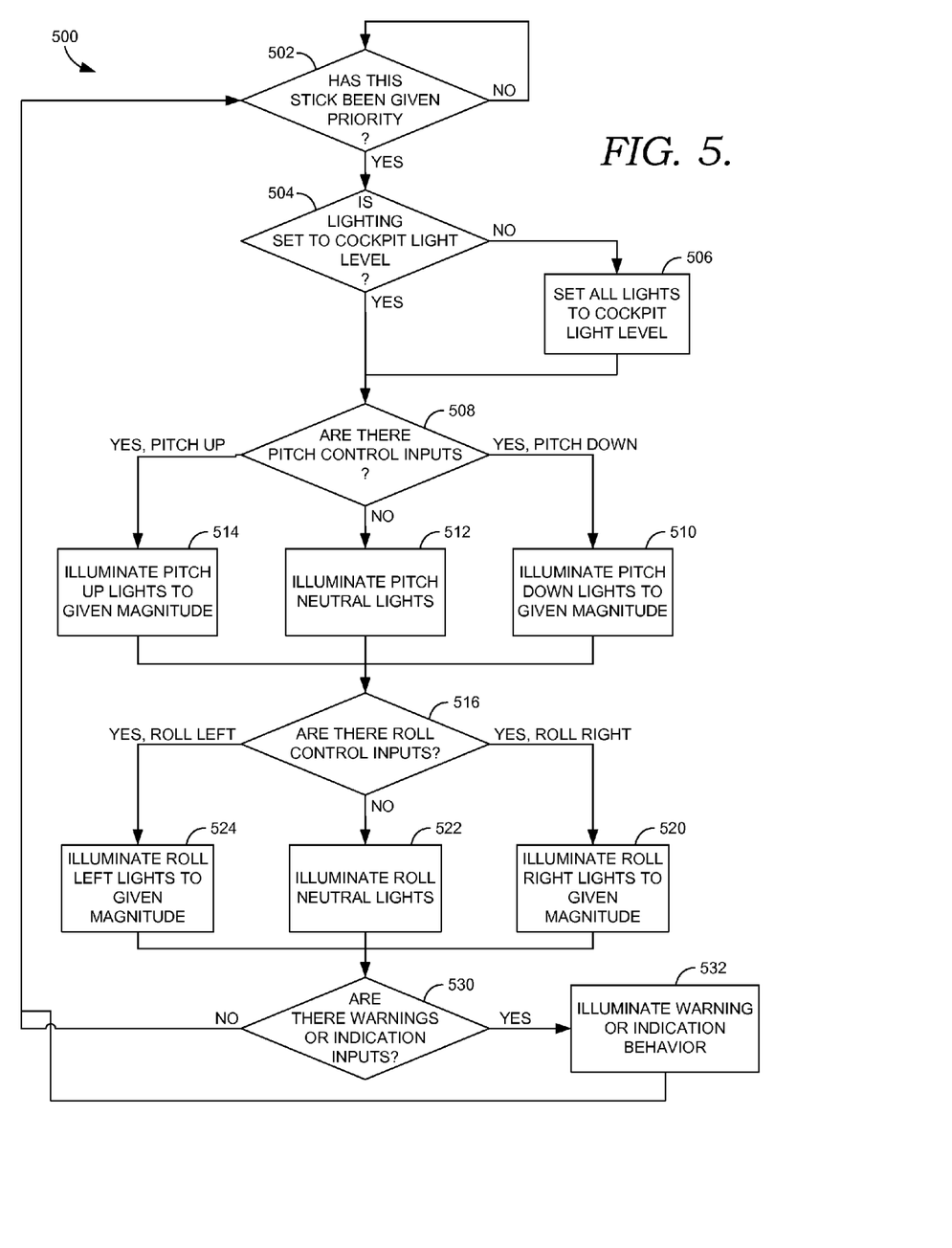
FIG. 5 shows a method for illuminating a sidestick controller in response to information associated with the control of an aircraft.

As described herein, in some embodiments, the system 350 may illuminate a sidestick controller based on certain control information (e.g., pitch and/or roll information), lighting information, and so on. FIG. 5 shows a flow diagram illustrating a method or routine 500 for illumination of a sidestick controller in response to information associated with the control of an aircraft.

In step 502, the system 350 determines whether a sidestick controller has been given priority. If the sidestick controller has been given priority, routine 500 proceeds to step 504; else, the system 350 periodically determines the priority of the sidestick controller.

In step 504, the system 350 determines whether the sidestick controller's lighting is set to a cockpit light level. When the sidestick controller's lighting is not satisfactorily set, routine 500 proceeds to step 506, and the system 350 sets all of sidestick controller's lights to the cockpit lighting level. When the lighting is properly set, routine 500 proceeds to step 508.

In step 508, the system 350 determines whether there are any pitch control inputs. When the system 350 determines there are "pitch down" inputs, routine 500 proceeds to step 510, and the system 350 causes the sidestick controller to illuminate pitch down lighting elements with a certain magnitude. When the system 350 determines there are no pitch inputs, routine 500 proceeds to step 512, and the system 350 causes the sidestick controller to illuminate pitch neutral lighting elements with a certain magnitude. When the system 350 determines there are "pitch up" inputs, routine 500 proceeds to step 514, and the system 350 causes the sidestick controller to illuminate pitch up lighting elements with a certain magnitude.

In step 516, the system 350 determines whether there are any roll control inputs. When the system 350 determines there are "roll right" inputs, routine 500 proceeds to step 520, and the system 350 causes the sidestick controller to illuminate roll right lighting elements with a certain magnitude. When the system 350 determines there are no roll inputs, routine 500 proceeds to step 522, and the system 350 causes the sidestick controller to illuminate roll neutral lighting elements with a certain magnitude. When the system 350 determines there are "roll left" inputs, routine 500 proceeds to step 524, and the system 350 causes the sidestick controller to illuminate roll left lighting elements with a certain magnitude.

In step 530, the system 350 determines whether there are any warning or indication inputs. When the system 350 determines there are warning or indication inputs, routine 500 proceeds to step 532, and the system 350 causes the sidestick controller to illuminate the sidestick controller with a warning or indication pattern. When there are no warning or indication inputs, routine 500 proceeds back to step 502.

Thus, the system 350 may utilize various different types of input, such as control inputs, lighting level inputs, warning inputs, and so on, when determining and/or presenting a lighting behavior or patterns via a sidestick controller. FIGS. 6A-6D are schematic diagrams illustrating example illumination behaviors of a sidestick controller.

Figure 6A:
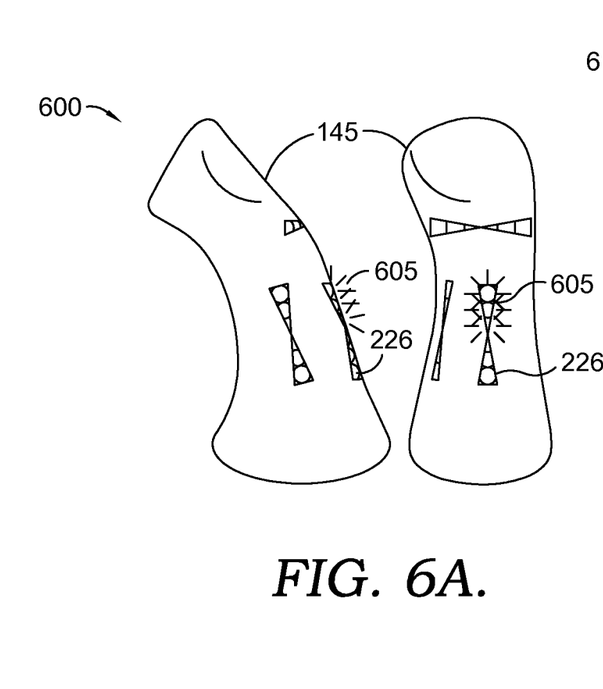
FIGS. 6A-6D are schematic diagrams illustrating the illumination of a sidestick controller in response to information associated with the control of an aircraft.

FIG. 6A depicts a sidestick controller 600 presenting an illumination pattern representative of a "pitch up" control input, as described in step 514 of FIG. 5. The sidestick controller 600 may illuminate a top portion 605 of the middle lighting element 226 to represent the "pitch up" control input.

Figure 6B:
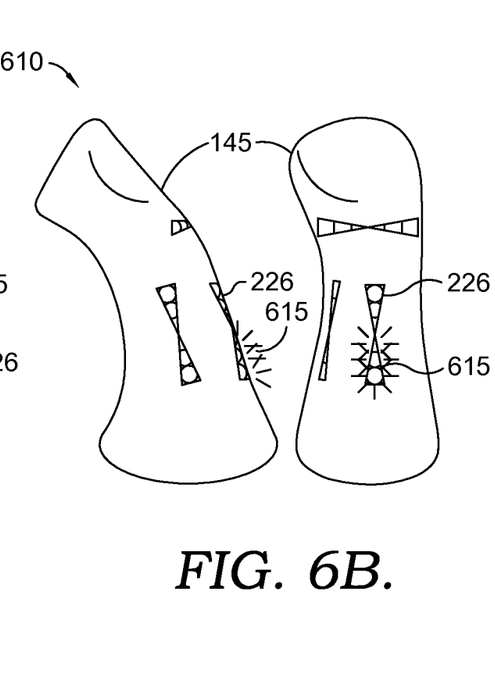

FIG. 6B depicts a sidestick controller 610 presenting an illumination pattern representative of a "pitch down" control input, as described in step 510 of FIG. 5. The sidestick controller 610 may illuminate a bottom portion 615 of a middle lighting element 226 to represent the "pitch down" control input.

Figure 6C:
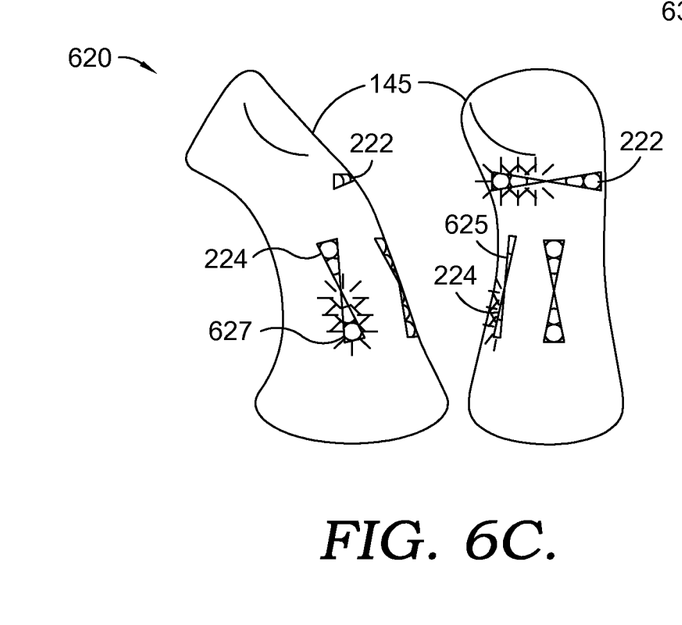

FIG. 6C depicts a sidestick controller 620 presenting an illumination pattern representative of a "roll left" control input, as described in step 524 of FIG. 5. The sidestick controller 620 may illuminate the left portion 625 of the top lighting element 222 along with a bottom portion 627 of the side lighting element 224 to represent the "roll left" control input.

Figure 6D:
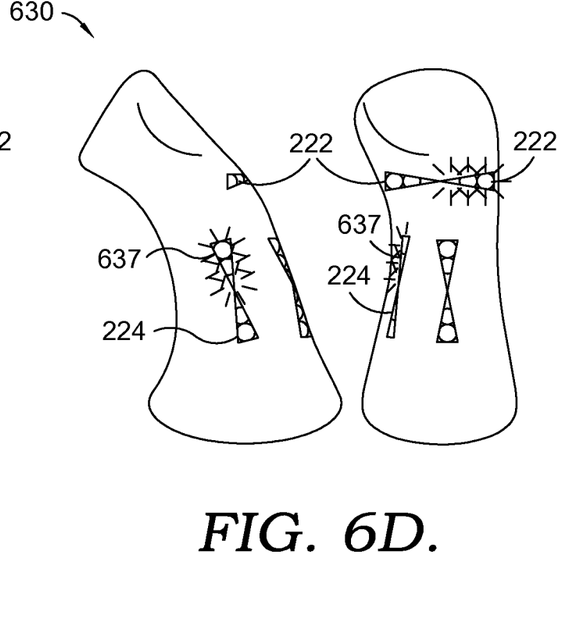

FIG. 6D depicts a sidestick controller 630 presenting an illumination pattern representative of a "roll right" control input, as described in step 520 of FIG. 5. The sidestick controller 630 may illuminate a right portion 635 of the top lighting element 222 along with a top portion 637 of the side lighting element 224 to represent the "roll left" control input.

Figure 7:
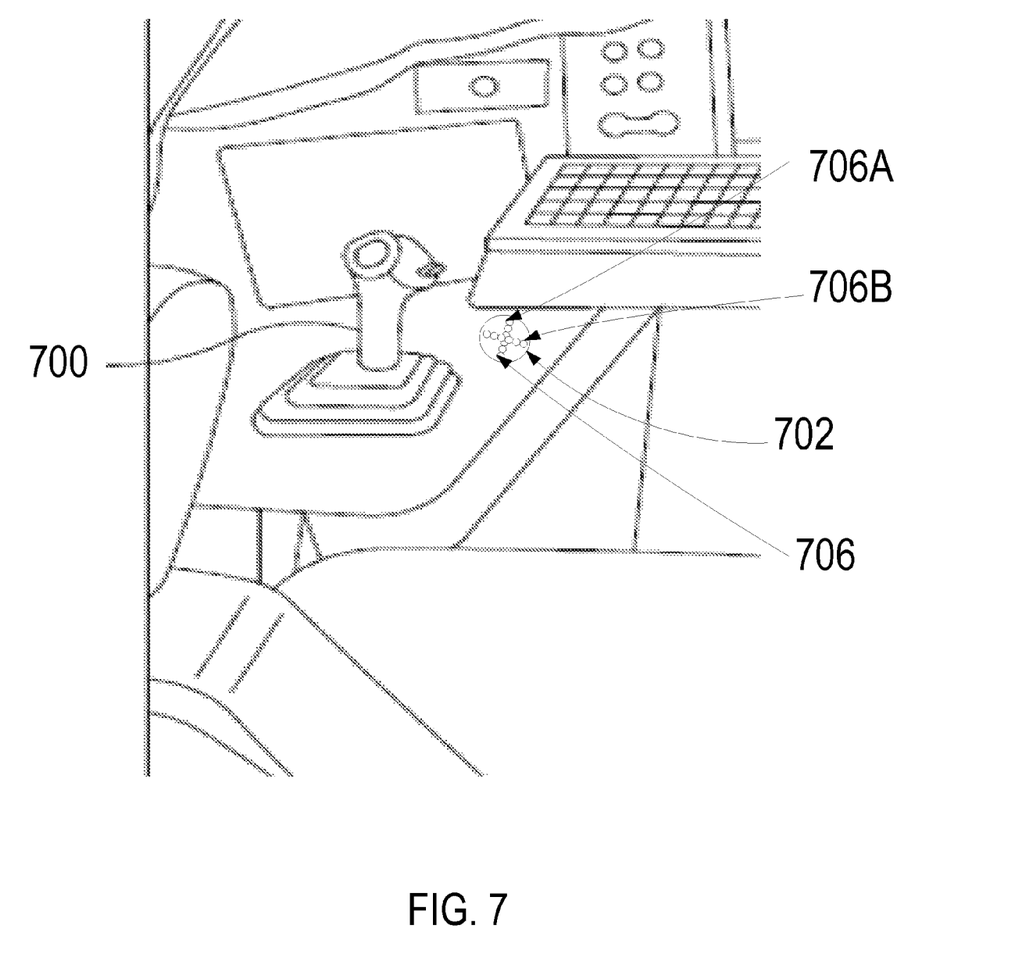
FIG. 7 shows an alternate embodiment of the sidestick controller system of FIG. 3A wherein an illuminating component is placed adjacent the sidestick controller.

People of skill in the art will appreciate that the lighting components (e.g., lighting components 212, 214 and 216 in FIG. 2A) need not be placed on (or housed within) the sidestick controllers (e.g., the sidestick controller 140). Rather, the lighting components may be placed anywhere in the aircraft (e.g., within the instrument panels 130 (FIG. 1), next to the pilot station 110, adjacent the sidestick controller, et cetera). People of skill in the art will further appreciate that the lighting components expressly disclosed herein (e.g., lighting components 212, 214, and 216) are exemplary only, and that differently shaped and/or typed lighting components may be used. For example, FIG. 7 shows an alternate embodiment wherein a sidestick controller 700 is associated (e.g., in wired and/or wireless electronic communication) with an illumination module 702 that is adjacent the controller 700 and which comprises two intersecting strips 706A, 706B of lights 706.

Thus, in embodiments, the systems disclosed herein may display and/or present illumination patterns and behaviors indicative of aircraft operations via a sidestick controller of the aircraft. Utilizing the sidestick controller may enable a flight crew to receive feedback, warnings, and other information associated with operation of an aircraft flight control system in a convenient and reliable fashion and during all types of cockpit lighting environments. Such information may assist in safe operation of an aircraft, contributing to an increase in awareness of the operation and activity of the aircraft, among other benefits. Further, the systems may alleviate and/or augment the need for active sidestick control systems, because the systems may provide operation and activity via lighting patterns displayed by the sidestick controllers, among other things.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while steps, processes, or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

I claim:

1. A sidestick controller for use in an aircraft, comprising:
    a control module, wherein the control module is configured to control operation of the aircraft; and
    an illumination module, wherein the illumination module is configured to display one or more lighted signals within response to operation of an auto-flight system of the aircraft;
    wherein the illumination module is configured to display one or more colors associated with the operation of the aircraft; and the illumination module is located on the sidestick controller.

2. The sidestick controller of claim 1, wherein the illumination module is configured to display the one or more lighted signals in response to operation of a second sidestick controller of the aircraft.

3. The sidestick controller of claim 1, wherein the illumination module is configured to modify an intensity of the one or more lighted signals in response to information associated with lighting of a cabin within the aircraft.

4. The sidestick controller of claim 1, wherein the illumination module is configured to display one or more lighted signals indicative of a roll operation of the aircraft when the aircraft is undergoing a roll operation.

5. The sidestick controller of claim 1, wherein the illumination module is configured to display the one or more lighted signals to indicate a pitch operation of the aircraft when the aircraft is undergoing the pitch operation.

6. The sidestick controller of claim 1, wherein the illumination module is configured to display a first color when the sidestick controller is a priority stick for actively controlling the aircraft, and a second color when the sidestick controller is not the priority stick.

7. The sidestick controller of claim 1, wherein the illumination module is configured to display the one or more lighted signals in response to a warning or cue signal.

8. The sidestick controller of claim 1, wherein the illumination module displays the one or more lighted signals via a display device.

9. A system for indicating information associated with control of an aircraft, the aircraft having a flight control system, the system comprising:
    an information component, wherein the information component is configured to determine a state of control of the flight control system based on information received from an auto-flight system of the aircraft; and
    an illumination component,
        wherein the illumination component is configured to illuminate one or more indicators located on or associated with a sidestick controller of the aircraft in response to the determined state of control of the flight control system;
        wherein the illumination module is configured to display one or more colors associated with the operation of the aircraft; and the illumination module is located on the sidestick controller.

10. The system of claim 9, wherein the information component is configured to determine if the sidestick controller has been given priority.

11. The system of claim 9, wherein the information component is configured to determine whether a warning or cue is to be given.

12. The system of claim 9, wherein the information component is configured to determine whether the aircraft is being commanded to perform a roll operation.

13. The system of claim 9, wherein the information component is configured to determine whether the aircraft is being commanded to perform a pitch operation.

14. The system of claim 9, wherein the information component is configured to determine if the sidestick controller has been given priority; and wherein the illumination component is configured to illuminate the one or more indicators with a pattern of lights indicative of priority.

15. The system of claim 9, wherein the information component is configured to determine if a warning or cue is to be given; and wherein the illumination component is configured to illuminate the one or more indicators with a pattern of lights indicative of the warning or cue.

16. The system of claim 9, wherein the information component is configured to determine whether the aircraft is being commanded to perform a roll operation; and wherein the illumination component is configured to illuminate the one or more indicators with a pattern of lights indicative of the roll operation.

17. The system of claim 9, wherein the information component is configured to determine whether the aircraft is being commanded to perform a pitch operation; and wherein the illumination component is configured to illuminate the one or more indicators with a pattern of lights indicative of the pitch operation.

18. The system of claim 9, wherein the information component is configured to determine whether the aircraft is being commanded to perform a roll or pitch operation based on information received from another sidestick controller of the aircraft.

19. A method for displaying lighted information via a sidestick controller of an aircraft, the method comprising:
  identifying whether a sidestick controller is assigned priority; and
  when the sidestick controller is not assigned priority:
  receiving pitch control input information from an auto-flight system within the aircraft;
  illuminating pitch lights of the sidestick controller based on the received pitch control input information;
  receiving roll control input information from an auto-flight system within the aircraft: and
    illuminating roll lights of the sidestick controller based on the received roll control input information;
      wherein the illumination module is configured to display one or more colors associated with the operation of the aircraft; and the illumination module is located on the side stick controller.

20. The method of claim 19, further comprising:
  receiving warning or cue input information; and
  illuminating one or more indicators of the sidestick controller based on the received warning or cue input information.

21. The method of claim 19, wherein receiving pitch control information includes receiving pitch control information from another sidestick controller within the aircraft.

22. The method of claim 19, wherein receiving roll control information includes receiving roll control information from another sidestick controller within the aircraft.

* * * * *